United States Patent [19]
Carter, III

[11] Patent Number: 5,992,719
[45] Date of Patent: Nov. 30, 1999

[54] EXPANDABLE STORAGE ENCLOSURE FOR OPEN LOADBED PICKUP TRUCK

[75] Inventor: Robert B. Carter, III, Dallas, Tex.

[73] Assignee: Bradley S. Schlachter, Dallas, Tex.

[21] Appl. No.: 09/039,215

[22] Filed: Mar. 14, 1998

[51] Int. Cl.$^6$ ........................................................ B60R 9/00
[52] U.S. Cl. ........................ 224/404; 224/542; 224/544; 296/37.6; 220/8
[58] Field of Search .................................. 224/400, 402, 224/403, 404, 539, 542, 543, 544, 548, 550, 551, 554, 555, 556, 321; 190/21, 22, 103, 104, 105; 296/37.6; 220/8

[56] References Cited

U.S. PATENT DOCUMENTS

| | | | |
|---|---|---|---|
| 1,849,046 | 3/1932 | Arndt | 190/22 |
| 1,893,753 | 1/1933 | Shelton | 190/22 |
| 1,941,375 | 12/1933 | Wildman | 190/22 |
| 2,475,961 | 7/1949 | Hilbert | 190/105 |
| 2,889,097 | 6/1959 | Broehl . | |
| 4,215,896 | 8/1980 | Drouin | 296/24 R |
| 4,215,898 | 8/1980 | Ulics | 224/404 X |
| 4,451,075 | 5/1984 | Canfield | 296/37.6 |
| 4,506,870 | 3/1985 | Penn | 296/1 S |
| 4,635,992 | 1/1987 | Hamilton et al. | 224/404 X |
| 4,718,583 | 1/1988 | Mullican | 224/404 X |
| 4,749,226 | 6/1988 | Heft | 296/37.6 |
| 4,811,875 | 3/1989 | DiSimone | 224/551 X |
| 4,828,312 | 5/1989 | Kinkel et al. | 296/37.6 |
| 4,884,838 | 12/1989 | Slater | 296/24.1 |
| 4,938,398 | 7/1990 | Hallsen | 224/42.42 |
| 4,938,519 | 7/1990 | Schlachter | 296/37.6 |
| 4,946,215 | 8/1990 | Taylor | 224/404 X |
| 5,037,153 | 8/1991 | Stark | 224/404 X |
| 5,052,737 | 10/1991 | Farmer, Jr. | 224/404 X |
| 5,083,829 | 1/1992 | Fonseca | 296/37.6 |
| 5,169,200 | 12/1992 | Pugh | 296/37.6 |
| 5,183,307 | 2/1993 | Chiu, Jr. | 296/24.1 |
| 5,207,469 | 5/1993 | Rossi | 296/37.6 |
| 5,232,259 | 8/1993 | Booker | 296/37.6 |
| 5,320,397 | 6/1994 | Peterson et al. | 296/37.1 |
| 5,324,089 | 6/1994 | Schlachter | 296/37.5 |
| 5,441,183 | 8/1995 | Frenzel | 224/542 |
| 5,498,049 | 3/1996 | Schlachter | 296/37.6 |
| 5,513,580 | 5/1996 | Franks | 220/8 X |
| 5,564,776 | 10/1996 | Schlachter | 296/37.6 |
| 5,598,962 | 2/1997 | Schlachter | 224/542 |
| 5,715,980 | 2/1998 | Blankenberg et al. | 224/321 |

Primary Examiner—Allan N. Shoap
Assistant Examiner—Gregory M. Vidovich
Attorney, Agent, or Firm—Dennis Griggs

[57] ABSTRACT

The left and right side panels of a portable storage enclosure are intersected by window openings through which left and right side support members can be extended laterally into engagement with the load deck sidewalls of a pickup truck. The storage enclosure is installed in an operative position wherein the access opening of the storage enclosure is presented substantially flush with the tailgate access opening so that the storage compartment is conveniently accessible when the tailgate is open and is secured against unauthorized access when the tailgate is closed. Vertical movement of the storage enclosure relative to the load deck is blocked by engagement of the side support members against side pocket portions formed in the deck sidewalls. Forward movement of the storage enclosure is limited by engagement of a stop flange against end portions of the deck sidewalls. Rearward movement of the storage enclosure is blocked by the tailgate when it is in the closed position. The storage enclosure can be quickly removed from the load deck without tools simply by opening the tailgate and retracting the side support members into the storage compartment to permit the storage enclosure to separate from the deck sidewalls.

10 Claims, 6 Drawing Sheets

EXPANDABLE STORAGE ENCLOSURE FOR OPEN LOADBED PICKUP TRUCK

BACKGROUND OF THE INVENTION

This invention is related generally portable storage enclosures, and in particular to a secure storage unit that is adapted for installation on the open load bed of a light duty pickup truck.

In the course of using utility motor vehicles by tradesmen in connection with various jobs, controlled or organized storage space is needed for such items as replacement parts, tools, equipment, supplies, blueprints and reference manuals that may require reasonably secure storage and shelter from the elements. The increasingly widespread use of open load bed pickup trucks as personal transportation vehicles has increased the need for improvements in storage enclosures in such vehicles which may be used for transporting and safeguarding personal items such as luggage, musical instruments, cameras, portable telephones, portable radios and other valuables. Certain other vehicles such as jeeps, vans, sport-utility vehicles and station wagons also lack organized, confined storage space adjacent the rear door or tailgate.

It is known to provide storage enclosures or trunks for securing portable property such as tools, luggage and equipment on the open load bed of a utility vehicle or light duty pickup truck. Pickup trucks include a generally rectangular box-like load bed, and storage enclosures and security trunks have been developed which mount on the forward portion of the load bed, just behind the vehicle cab. Although such enclosures provide secure and substantially weather-tight storage for personal property, the forward deck installation makes access and retrieval difficult.

It has also been proposed to mount tool boxes or enclosures on the hinged tailgates of vehicles such as pickup trucks, wherein laterally spaced stanchions are secured to the tailgate and support a toolbox on trunnions which permit the toolbox to remain in a horizontal or upright position when the tailgate is open or closed. However, the clearance required to maintain such a toolbox in an upright position, regardless of the position of the tailgate, requires the toolbox to occupy a considerable amount of space within the load bed.

It is often desirable to open the tailgate for insertion or removal of articles which have an overall length substantially the same as or slightly greater than the length of the load bed itself. Moreover, it is often necessary for tradesmen and craftsmen to use the tailgate in the open position as a work support surface while having ready access to tools, equipment and supplies near or adjacent to the tailgate. Still further, the entire deck of the load bed is sometimes needed for storage of materials when the tailgate is in an open or closed position. Front mounted tool boxes or storage enclosures do not satisfy that requirement. Moreover, other conventional storage enclosures for open load bed vehicles are difficult to remove from the load bed when the entire load bed space is needed.

U.S. Pat. Nos. 5,598,962; 5,564,776; 5,498,049; 5,324,089; 4,938,519; and Des. U.S. Pat. No. 321,159, all assigned to the assignee of the present invention, disclose and claim certain improvements in portable storage enclosures for installation on motor vehicles equipped with hinged tailgates.

BRIEF SUMMARY OF THE INVENTION

The present invention provides a portable storage enclosure or trunk for installation on utility vehicles, including in particular light duty open load bed pickup trucks, jeeps and other vehicles that have a hinged closure door or tailgate mounted across the access opening of the load bed. The enclosure provides secure storage space for job-related tools and equipment as well as personal property items and other valuables which are to be transported within a convenient storage compartment and sheltered from the elements.

The storage enclosure of the present invention is adapted to be quickly mounted on and removed from the load bed of a utility vehicle, such as a pickup truck, by side support members that are movably coupled to the storage enclosure and are laterally extendable into engagement against the left and right sidewalls. The storage enclosure is supported in an operative position adjacent the rear deck access opening and adjacent to a hinged tailgate which forms a common closure for the rear deck access opening and the storage enclosure access opening. The storage enclosure includes a generally horizontal top panel, a depending forward panel and laterally spaced, depending side panels. Each side panel is intersected by a window opening facing the adjacent load deck sidewall, respectively. The side support members project through the window openings and are extendable and retractable laterally.

The storage enclosure is installed by positioning its access opening adjacent the tailgate access opening, and then locking it in place by extending the side support members against the load deck sidewalls. According to this arrangement, the storage enclosure and side support members cooperate with the load deck sidewalls and tailgate to prevent removal of the storage enclosure from the load bed, with access to items contained in the storage compartment being allowed only upon opening the tailgate.

In the operative position, the access opening of the storage enclosure is presented substantially flush with the tailgate access opening, so that items contained in the storage compartment are conveniently accessible when the tailgate is open and are secured against unauthorized handling when the tailgate is closed. Vertical movement of the storage enclosure is blocked by engagement of the side support members against shoulder portions on the deck sidewalls. Forward movement is blocked by engagement of a stop member against the rear end portion of one of the load deck sidewalls. Rearward movement is blocked by the tailgate when it is closed.

The storage enclosure can be removed quickly and without tools by opening the tailgate and retracting at least one of the side support members into the storage compartment, thus permitting the storage enclosure to separate from the deck sidewalls and pass through the rear deck access opening.

The storage enclosure can be quickly installed or removed to permit utilization of the full length of the load deck of the vehicle, does not interfere with use of the tailgate as a work surface when mounted on the side support members, and provides convenient access to articles stored in the enclosure compartment when the tailgate is open.

Those skilled in the art will further appreciate the advantages and operational features of the present invention as well as other important aspects thereof upon reading the detailed description which follows with reference to the drawing figures.

DETAILED DESCRIPTION OF THE INVENTION

In the description which follows, like parts are marked throughout the specification and drawing with the same reference numerals, respectively. The drawing figures are not necessarily to scale in the interest of clarity.

Figure 1:
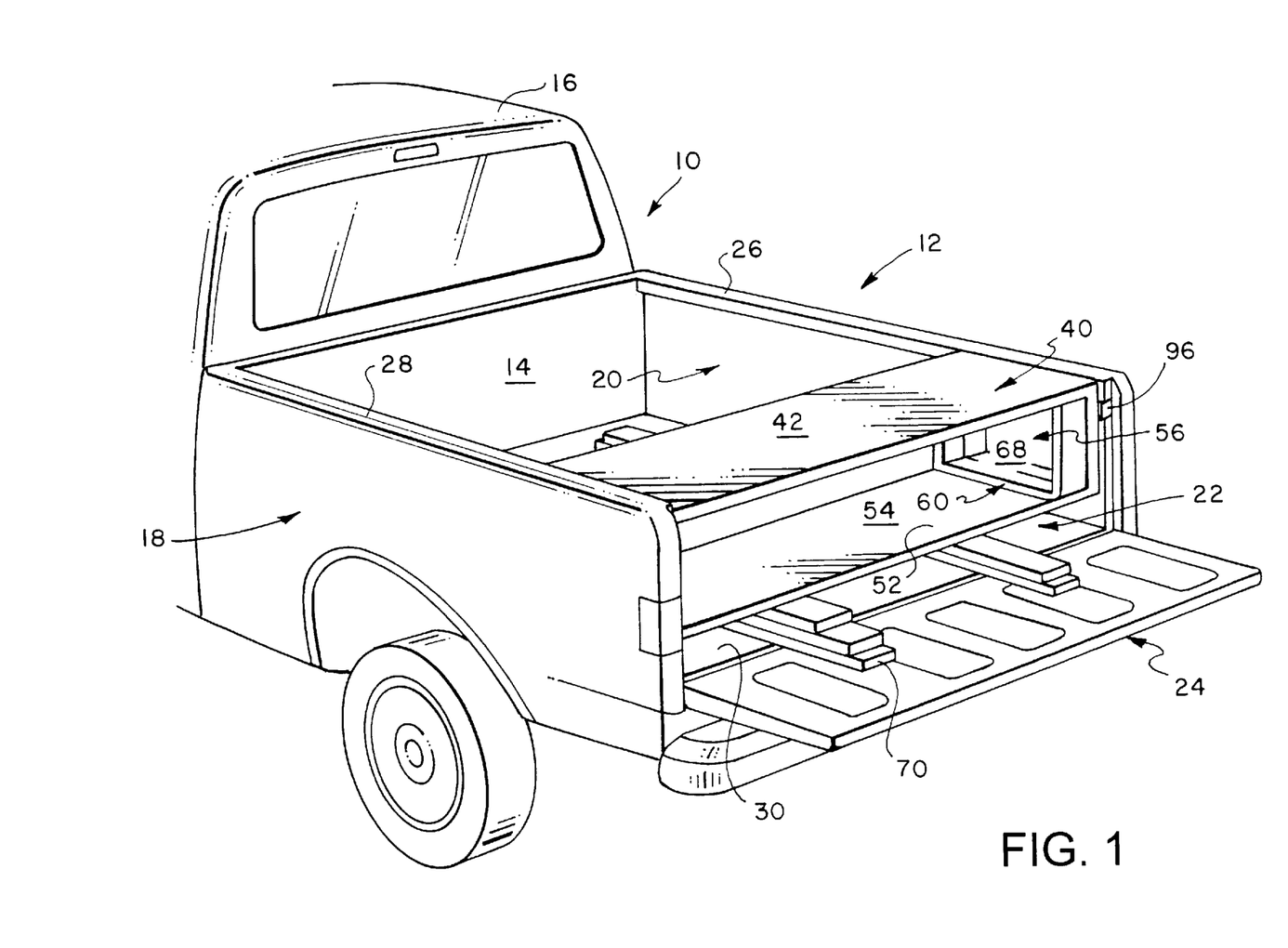
FIG. 1 is a rear perspective view of an open load bed pickup truck showing the portable storage enclosure of the present invention mounted in an operative position on left and right deck sidewalls, with the storage enclosure access opening being positioned substantially in flush alignment with the tailgate access opening.
Figure 2:
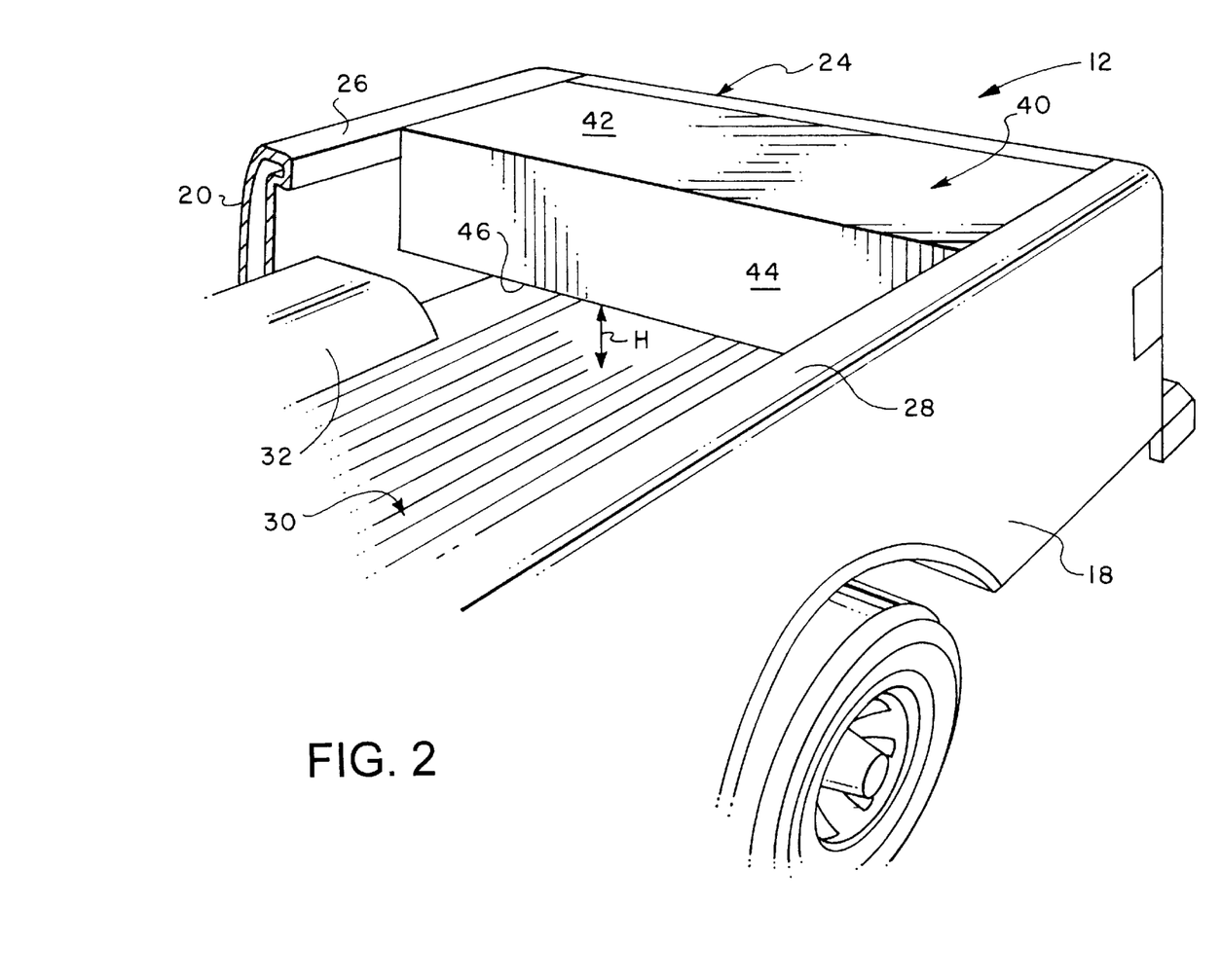
FIG. 2 is a left side perspective view thereof, showing the storage enclosure access opening covered by the tailgate in the closed position.

Referring to FIGS. 1, 2, 3 and 4, there is shown a motor vehicle, generally designated by the numeral 10, which in this exemplary embodiment is a light duty pickup truck. The vehicle 10 has a generally rectangular load bed 12, a portion of which is shown in the drawing figures and includes a front wall 14, rearward of a cab 16, opposed deck sidewalls 18 and 20 and a rear access opening 22 between the deck sidewalls. The rear access opening 22 can be closed by a hinged closure door or tailgate 24 of conventional construction, being movable between a generally horizontal, open position shown in FIG. 1 and an upright, closed position against the deck sidewalls, as shown in FIG. 2.

The deck sidewalls 18 and 20 have laterally inset longitudinal beam portions 26, 28 extending along their top edges as shown in FIG. 1 and FIG. 2. Accordingly, the deck sidewalls are recessed from the inner side edges of the beams 26 and 28 so that the transverse width of the load bed 12 is typically greater than the transverse width distance between the beam portions 26 and 28.

The load bed 12 also includes a generally flat load deck 30 extending between the sidewalls 18 and 20. Rear wheel well fenders 32 (FIG. 2) extend inboard from the deck sidewalls 18 and 20 as indicated. The tailgate 24 is movable about a horizontal hinge axis between the generally horizontal open position, FIG. 1, and the closed upright position, FIG. 2, in a conventional manner. Conventional latch means, not shown, are provided for securing the tailgate 24 in the upright closed position and a latch actuator or handle may be used to unlatch and move the tailgate 24 from its closed position to its open position. The latch handle may be lockable to prevent unauthorized operation of the tailgate 24. The tailgate 24 forms a closure for the rear access opening 22, FIG. 2, delimited by the deck sidewalls 18 and 20 and the load deck 30.

The tailgate structural features described above are generally conventional in light duty pickup trucks, jeeps and other utility vehicles which have open load beds. Such tailgate construction is also conventional in station wagon or similar utility type motor vehicles and may also be of the two-way type which includes a hinge coupling for moving the tailgate about a vertical hinge axis (not shown).

Referring again to FIG. 1, FIG. 2 and FIG. 3, a portable enclosure for storing tools, equipment, supplies and other materials or articles is illustrated and generally designated by the numeral 40. The storage enclosure 40 is dimensioned for mounting across and above the rear deck 30 of the load bed 12, immediately behind the fenders 32, 34 and just forward of the tailgate access opening 22.

The storage enclosure 40 includes a generally horizontally extending top panel 42 which has a width less than the distance between the beams 26 and 28 so that the storage enclosure 40 can be inserted horizontally through the access opening 22 between the beams. The storage enclosure 40 also includes a depending forward panel 44 which extends substantially normal to the top panel 42. The depending forward panel 44 has an overall height which sets its lower edge 46 at an elevated position above the load deck 30, as shown in FIG. 1 and FIG. 2, so that the full length of the load deck can be utilized for transporting oversized articles, such as lumber, beneath the storage enclosure 40. Such oversized articles ride on the tailage 24 when it is in the open position.

Figure 3:
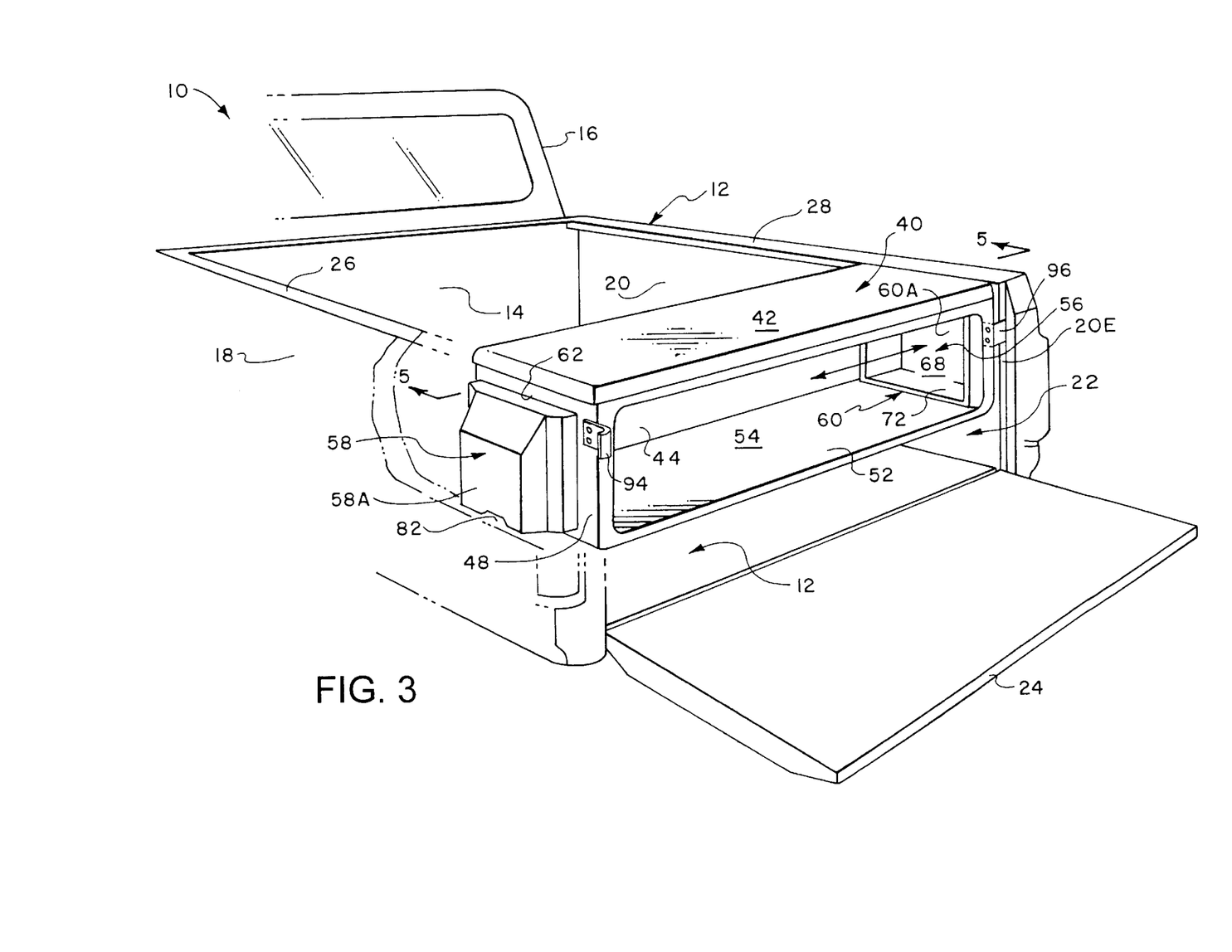
FIG. 3 is a rear perspective view of the portable storage enclosure installed over the rear load deck of an alternative open load bed pickup truck in the operative position in which side support members are extended laterally into engagement with the deck sidewalls.

The storage enclosure 40 further includes a depending left side panel 48, a depending right side panel 50 and a base panel 52. The panels are interconnected and sealed together, thereby defining top, forward, left side, right side and bottom boundaries of an interior storage compartment 54. The remaining side is open, thus providing a rear access opening 56 into the storage compartment 54. The rear access opening 56 is presented substantially flush with the load bed access opening 22 when the storage enclosure 40 is in the operative position as shown in FIG. 1, FIG. 2 and FIG. 3. According to this arrangement, the left and right side panels 48, 50 are dimensioned so that the external surface of the top panel 42 is flush with the beam portions 26, 28 and the bottom panel 52 is elevated above the load deck 30 by a height H, for example eight inches, when the storage enclosure 40 is mounted in the operative position.

The storage enclosure 40 is supported in the operative position on the deck sidewalls 18, 20 by left and right side support members 58, 60. The left and right side panels 48, 50 of the enclosure are intersected by rectangular window openings 62, 64 facing the adjacent load deck sidewalls 18, 20, respectively. The side support members 58, 60 project through the window openings and are extendable and retractable laterally. That is, each side support member is movable from a retracted position, as shown in FIG. 6, in which all or substantially all of each side support member is contained completely within the storage compartment 54, to a support position in which an extended portion of each side support member projects through the window openings 62, 64 externally of the left and right side panels for engaging the left and right deck sidewalls, as shown in FIG. 5.

Figure 4:
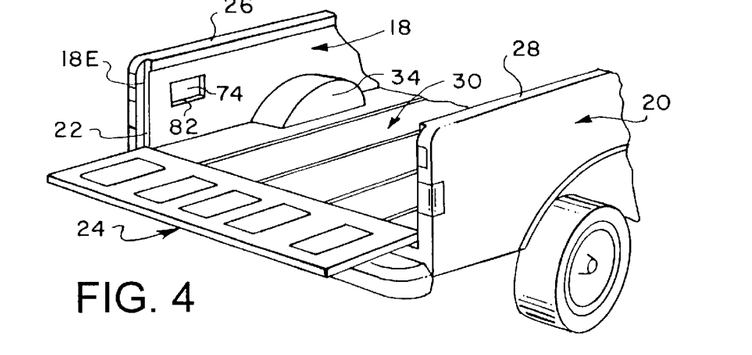
FIG. 4 is a rear perspective view of the pickup truck load bed of FIG. 1 with the portable storage enclosure removed, showing a typical sidewall pocket formed in the left deck sidewall.
Figure 5:
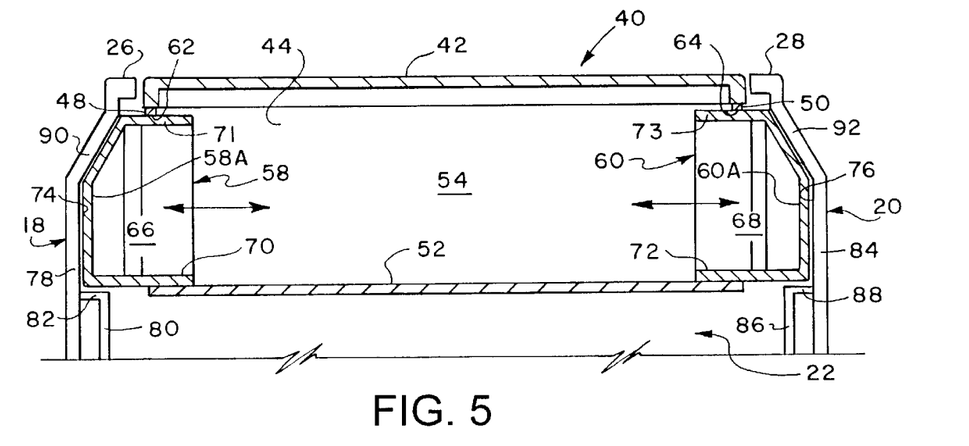
FIG. 5 is a sectional view taken along the line 5—5 of FIG. 3, showing the side support members fully extended into the deck sidewall pockets (it is noted that, in light of very similar structure and function, like reference characters are hereinafter used to describe the pockets and bed walls between the structure shown in FIGS. 4 and 5 for clarity)
Figure 6:
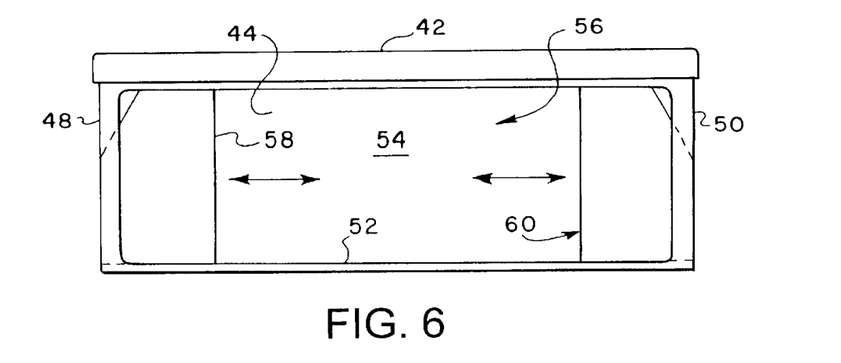
FIG. 6 is a front elevational view of the storage enclosure of FIG. 1 showing the side support members fully retracted into the storage compartment.

Referring now to FIG. 4 and FIG. 5, each side support member 58, 60 includes multiple panel portions interconnected to form sidewall boundaries of interior side pockets 66, 68 that open into the main storage compartment 54. According to this arrangement, the storage capacity or volume of the main storage compartment 54 is enlarged or expanded when the side support members 58, 60 are extended into engagement with the deck sidewalls as shown in FIG. 5.

The side support member 58, 60 include base panel members 70, 72, respectively, that are disposed in slidable engagement with the enclosure base panel 52 for supporting extension and retraction movement of the side support members. The side support members also include top panel members 71, 73 that are disposed in slidable engagement with the side panels 48, 50.

Referring again to FIG. 4 and FIG. 5, side pockets 74, 76 are formed in the left and right deck sidewalls 18, 20 for receiving the externally projecting portions of the left and right side support members when the storage enclosure 40 is mounted in the operative position. This deck sidewall arrangement is typical of certain vehicles in which interior sidewall pockets are formed on the inside surface of the left and right deck sidewalls. Typically, such pockets are relatively shallow, for example about one to two inches in depth, and extend about six inches in length and three inches in height. The pockets are typically located near the tailgate end of the load bed, and are spaced vertically about midway between the load deck and the beam portions 26, 28 of the deck sidewalls. According to this arrangement, the externally projecting portions of the left and right side support members 58, 60 are insertable into the left and right side pockets, respectively, as shown in FIG. 5, in the extended support position.

In this exemplary mounting arrangement, the left deck sidewall 18 include panel portions 78, 80 that are laterally offset from each other and are interconnected by a shoulder member 82, as shown in FIG. 5. A similar arrangement is provided on the right deck sidewall 20 by deck sidewall panel portions 84, 86 and a connecting shoulder portion 88. According to this arrangement, the externally projecting portions of the left and right side support members 58, 60 are extendable into overlapping engagement with the left and right shoulder members 82, 88, respectively, in the extended support position.

The shoulders 82, 88 provide subjacent support for the storage enclosure 40 in the operative position, and maintain the storage enclosure base panel 52 at an elevation H relative to the load deck 30. Upward vertical movement of the storage enclosure is blocked by engagement of the left and right side support members against sloping panel portions 90, 92 which form a part of the left and right deck sidewalls 18, 20, respectively.

Referring again to FIG. 3, forward movement of the storage enclosure 40 relative to the rear deck access opening 22 is limited by engagement of a pair of stop members 94, 96 against the deck sidewall end portions. The stop members are attached to the enclosure side panels by screw fasteners, and each stop member includes a flange portion that projects laterally with respect to the enclosure side panel and in parallel with the plane of the enclosure access opening 22. Each flange portion is engagable in overlapping relation with end portions 18E, 20E of the load deck sidewalls, thus limiting forward movement of the storage enclosure 40 relative to the rear deck access opening 22 when the storage enclosure is mounted in the operative position.

The storage enclosure 40 is thus supported in the operative position above the load deck 30 by engagement of the side support members 58, 60 against shoulder portions of the load deck sidewalls. The rear access opening 56 of the storage enclosure is positioned closely adjacent the rear deck access opening 22 so that the storage compartment access opening and the rear deck access opening are both covered when the tailgate 24 is in the closed position as shown in FIG. 2. That is, access to the storage enclosure compartment and the rear deck access opening are closed simultaneously and opened simultaneously by movement of the tailgate 24 between the closed and opened positions. The rear access opening 56 of the storage enclosure is presented flush with the tailgate access opening 22, so that articles in the storage compartment 54 are immediately accessible when the tailgate 24 is open, and are secured against unauthorized removal when the tailgate is closed.

The storage enclosure 40 can be removed from the load bed to permit on-loading or off-loading of large items through the tailgate access opening 22, simply by retracting the side support member into the storage compartment. Alternatively, the storage enclosure 40 can be reinstalled on the load deck when desired by extending the side support member into engagement with the deck sidewalls. Both installation and removal can be performed without tools or other special equipment.

Figure 7:
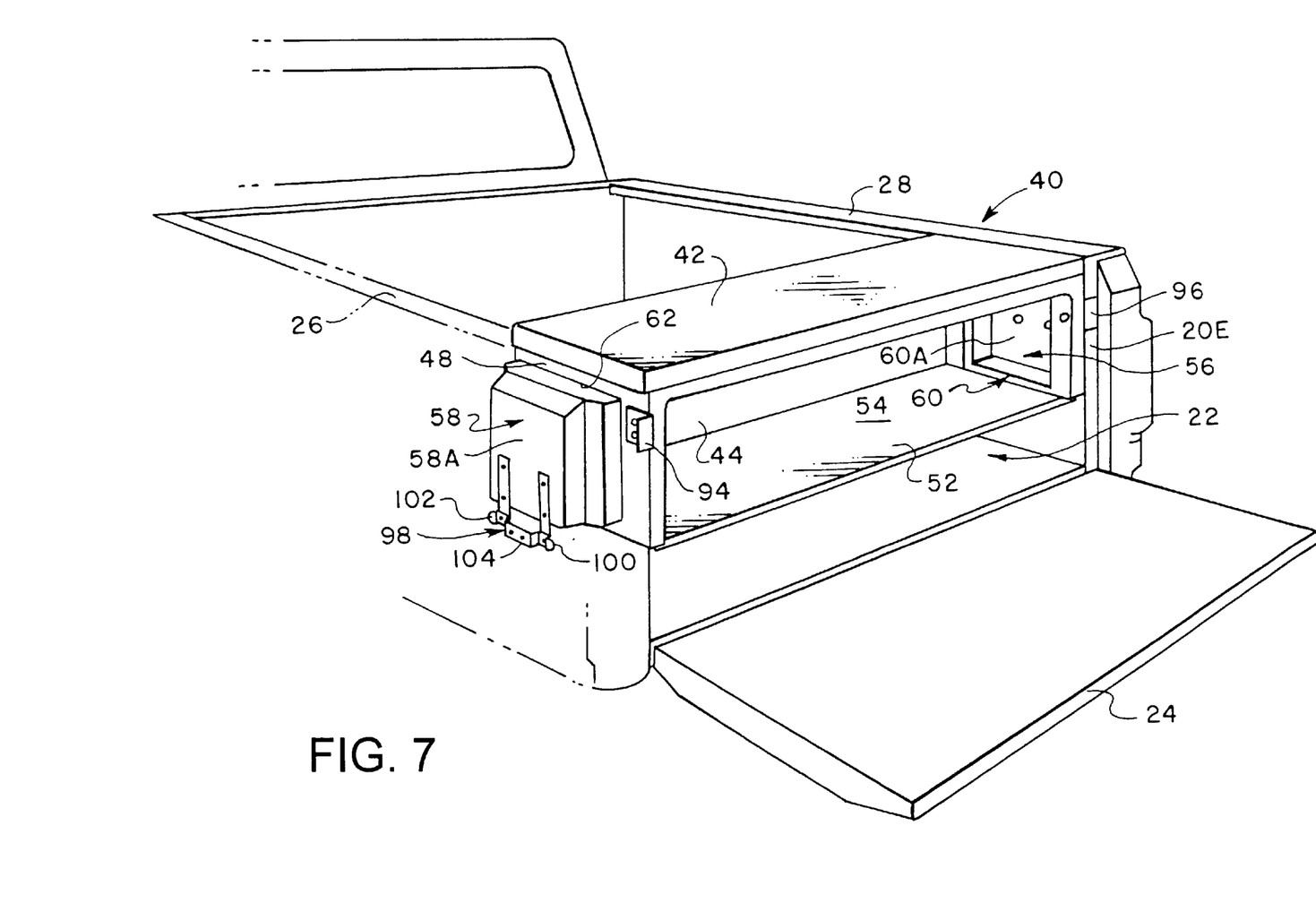
FIG. 7 is a rear perspective view, partly in phantom and partly broken away, showing an alternative mounting arrangement.

An alternative mounting arrangement will now be described with reference to FIG. 7, FIG. 8 and FIG. 9. According to this alternative mounting arrangement, a mounting bracket 98, is attached to the pocket panel 78 inside of the pocket 74 by sheet metal screw fasteners. The mounting bracket 98 includes a pair of coupling arms 100, 102 that are laterally offset with respect to a mounting base 104. The mounting base 104 is intersected by a pair of bore holes that engage the screw fasteners. When the mounting base 104 is secured against the pocket panel 78, the coupling arms 100, 102 extend laterally out of the side pocket. Vertical coupling bars 106, 108 are attached to the coupling arms by threaded fasteners.

Referring again to FIG. 7, the storage enclosure 40 is adapted for attachment to the mounting bracket 74 by bore holes that are pre-drilled through side panels 58A, 60A. The bore holes are spaced apart to match corresponding bore holes in the coupling bars.

The storage enclosure 40 is installed on the load deck 12 by positioning it adjacent the mounting brackets until the bore holes are aligned with the screw nuts on the coupling bars of the side mounting brackets. The side support members 58, 68 are then extended and rigidly attached to the mounting brackets by sheet metal screw fasteners that are inserted through the aligned bore holes, and in threaded engagement with the screw nuts.

The mounting brackets 98 provide quick, convenient attachment points for the storage enclosure 40, but do not obstruct the load deck space or otherwise interfere with loading or unloading operations.

The storage enclosure 40 is preferably fabricated of a suitable engineering material such as sheet steel or aluminum, or reinforced plastic, for example. The fabrication of the storage enclosure 40 may be in accordance with conventional manufacturing processes, including molding of plastic materials. The enclosure 40 is proportioned such that, in the closed position of the tailgate 24, the rear transverse edge of the top panel 42 is contiguous with the top transverse edge of the tailgate. The peripheral edge portions of the storage enclosure that frame the rear access opening 56 may have a suitable resilient seal strip attached thereto, not shown, for engagement against the tailgate to form a substantially weather-tight seal, if desired.

The transverse width of the storage enclosure 40 may extend substantially between the load deck sidewalls 18 and 20 or be somewhat less than the distance between the sidewalls. The overall height of the storage enclosure 40, with respect to the deck 30, is preferably about the same or slightly less than the height of the tailgate 22 in its closed position. The forward panel 44 may extend forwardly to a position just behind the wheel well fenders 32, 34, for example.

Figure 8:
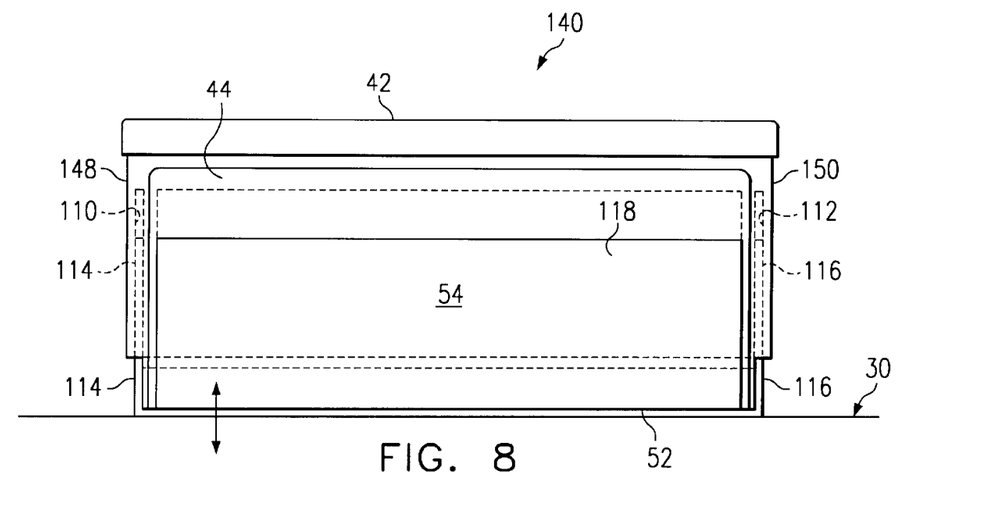
FIG. 8 is a perspective view of the base panel assembly that forms a part of an expandable storage enclosure; and, FIG. 9 is an elevational view, partly in phantom, showing the expandable storage enclosure of FIG. 8 with the base panel assembly extended, thereby expanding the volume of the storage compartment.
Figure 9:
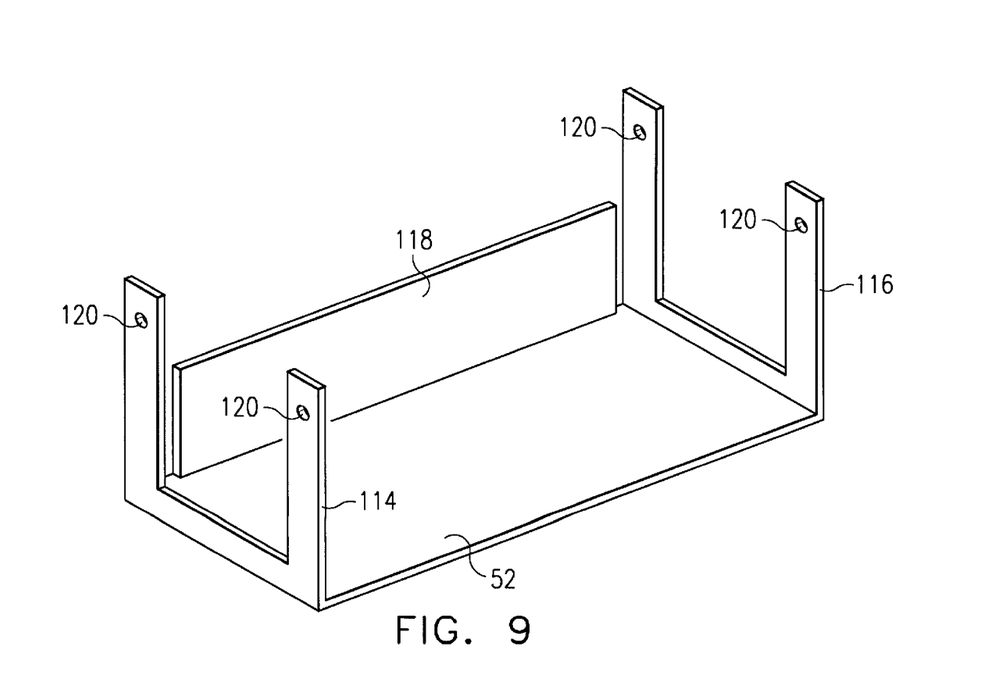

Referring now to FIG. 8 and FIG. 9, a storage enclosure 140 is constructed according to an alternative embodiment of the invention in which the base panel 52 is movably coupled to left and right depending side panels 148, 150. According to this arrangement, the volume of the storage compartment 54 can be enlarged by extending the base panel 52 downwardly into engagement with the load deck 30, as shown in FIG. 9.

According to this alternative embodiment, the left and right depending side panels 148, 150 are intersected by longitudinally extending slots 110, 112 for receiving coupling arms 114, 116, respectively. The coupling arms 114, 116 are attached to the base panel 52 and project upright for slidable extension and retraction movement through the longitudinal slots. The upper end portions of the coupling arms are intersected by bore holes 120 that are alignable with pre-drilled bore holes in the depending side panels 148, 150 for locking the coupling arms onto the depending side panels. A forward panel segment 118 is attached to the base panel and is disposed in overlapping slidable engagement with the depending front panel 44.

I claim:

1. A storage enclosure for installation in an operative position adjacent a rear deck access opening on a motor vehicle of the type including an open load deck and opposed left and right deck sidewalls spaced apart along opposite sides of the load deck, the rear deck access opening formed between the left and right deck sidewalls, and the left and right deck sidewalls having left and right side pockets formed therein, respectively, the storage enclosure comprising:

enclosure panels interconnected to form sidewall boundaries of a storage compartment having an access opening, the enclosure panels including left and right side panels having left and right window openings formed therein and spanning a substantial portion thereof, respectively; and, left and right side support members disposed in the left and right side window openings, respectively, each side support member being movable from a retracted position in which a portion of each side support member lies inside of the storage compartment, to an extended support position in which a portion of each side support member projects externally of the first and second side panels;

the externally projecting portions of the left and right side support members being insertable into the left and right side pockets, respectively, when the storage enclosure is installed in the operative position.

2. A storage enclosure as set forth in claim 1, each side support member including panel portions interconnected to form sidewall boundaries of an auxilary storage pocket that opens into the storage compartment.

3. A storage enclosure as set forth in claim 1, the left and right side pockets each including a shoulder member disposed therein, each shoulder member being elevated from the load deck, the externally projecting portions of the left and right side support members being disposed in overlapping engagement with the left and right shoulder members, respectively, when the side support members are inserted into the side pockets, respectively, in the operative position.

4. A storage enclosure as set forth in claim 1, the opposed left and right side pockets each including first and second sidewall panel members laterally offset from each other and a shoulder member interconnecting the offset sidewall panel members, and the externally projecting portions of the left and right side support members being extendable into overlapping engagement with the left and right shoulder members, respectively, when the storage enclosure is installed in the operative position.

5. A storage enclosure as set forth in claim 1, wherein each of the side pockets includes a shoulder and the externally projecting portions of the left and right side support members being extendable into overlapping engagement with the shoulder members of the left and right side pockets, respectively, when the storage enclosure is installed in the operative position.

6. A storage enclosure as set forth in claim 1, wherein the rear deck access opening is bounded by end portions of the left and right deck sidewalls, the storage enclosure further including:

a stop member attached to one of the enclosure side panels, the stop member including a flange portion projecting laterally with respect to the one enclosure side panel, the flange portion being engagable against the end portion of one of the deck sidewalls in the operative position.

7. A storage enclosure as set forth in claim 1, the enclosure panels having edge portions framing the storage compartment access opening, and the storage enclosure being supportable in the operative position by engagement of the side support members against the respective pocket of the load deck sidewalls, with the storage compartment access opening being positioned adjacent the rear deck access opening when the storage compartment is mounted in the operative position.

8. A storage enclosure as set forth in claim 1, the storage enclosure including a base panel connected to the left and right side panels, thereby defining a bottom boundary of the enclosure compartment, and each side support member being disposed in slidable engagement with the enclosure base panel between the extended and retracted positions of the side support members.

9. A storage enclosure as set forth in claim 1, including a stop member attached to the storage enclosure, the stop member projecting laterally from one of the storage enclosure side panels substantially in alignment with the plane of the storage enclosure access opening, the stop member being engagable against an end portion of one of the deck sidewalls for limiting forward movement of the storage enclosure relative to the rear deck access opening when the storage enclosure is installed in the operative position.

10. A storage enclosure as set forth in claim 1, further including:

a mounting bracket adapted to be disposed within each sidewall pocket and adapted to be attached to the deck sidewall; and, coupling means respectively connecting the side support members to the mounting brackets.

* * * * *